(12) United States Patent
Tsuji et al.

(10) Patent No.: US 7,903,976 B2
(45) Date of Patent: Mar. 8, 2011

(54) OPTICAL ELEMENT INTEGRATED MODULE

(75) Inventors: Hiromi Tsuji, Tokyo (JP); Kozo Fujii, Kanagawa (JP); Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 601 days.

(21) Appl. No.: 12/071,379

(22) Filed: Feb. 20, 2008

(65) Prior Publication Data

US 2008/0260384 A1  Oct. 23, 2008

(30) Foreign Application Priority Data

Apr. 20, 2007  (JP) .................................. 2007-111373

(51) Int. Cl.
*H04J 14/08* (2006.01)
(52) U.S. Cl. ........................................... 398/101; 398/68
(58) Field of Classification Search .................... 398/68, 398/101
See application file for complete search history.

(56) References Cited

U.S. PATENT DOCUMENTS

| 2004/0028089 A1* | 2/2004 | Shake et al. ................. 370/542 |
| 2009/0060525 A1* | 3/2009 | Von Lerber ................. 398/155 |

FOREIGN PATENT DOCUMENTS

| JP | 2005-026725 | 1/2005 |
| JP | 2008-085585 | 4/2008 |

OTHER PUBLICATIONS

"160 Gbit/s Ultra-High-Speed Optical Time Division Multiple/Separation Technique Using EA-Modulator" written by Hitoshi Murai, O plus E, May 2005, vol. 27, No. 5, pp. 535-540.
Murai, Kagawa, Tsuji, aand Fujii, "80-Gb/S Error-Free Transmission Over 5600 km Using A Cross Absorption Modulation Based Optical 3R Regenerator", IEEE Photonics Technology Letters, vol. 17, No. 9, Sep. 2005, pp. 1965-1967.
"Illustrated Optical Device Dictionary" issued by Optronics Co., Ltd, on Jul. 10, 1996, Part I, Explanation of Words, p. 128.

* cited by examiner

*Primary Examiner* — Matthew C Bella
*Assistant Examiner* — Jermaine Wilson
(74) *Attorney, Agent, or Firm* — Rabin & Berdo, P.C.

(57) ABSTRACT

In an optical element integrated module, first through n-th optical data signals are externally input to first ports of first through n-th optical circulators and are input to first through n-th optical/optical converters via second ports. The first through n-th optical/optical converters modulate first through n-th optical short pulse trains in accordance with the first through n-th optical data signals. First through n-th modulated optical data signals are input to the second ports of the first through n-th optical circulators and are input to an optical time division multiplexing section. The optical time division multiplexing section generates optical time division multiplexed signals by time division multiplexing the first through n-th modulated optical data signals.

9 Claims, 3 Drawing Sheets

OPTICAL ELEMENT INTEGRATED MODULE

CROSS-REFERENCE TO RELATED APPLICATION

This application claims priority under 35 USC 119 from Japanese Patent Application No. 2007-111373, the disclosure of which is incorporated by reference herein.

BACKGROUND OF THE INVENTION

1. Field of the Invention

The present invention relates to an optical element integrated module formed by integrating optical passive elements and optical active elements and more specifically to an optical element integrated module for modulating an optical short pulse train in accordance with an optical data signal.

2. Description of the Related Art

An optical element integrated module using a technology of modulating an optical short pulse train by utilizing an electrolyzation absorption effect of an EA (Electro-absorption) modulator has been disclosed in Japanese Patent Application Laid-open No. 2005-26725 or "160 Gbit/s Ultra-High-Speed Optical Time Division Multiple/Separation Technique Using EA-Modulator" written by Hitoshi Murai, O plus E, May 2005, vol. 27, No. 5, pp. 535-540 for example.

However, because in the technology described above the optical short pulse train are modulated by inputting a high frequency electrical signal to the EA modulator, it is necessary to provide an optical/electrical converter for converting an optical data signal into an electrical signal to obtain a high frequency electrical signal. Further, it is also necessary to provide an electrical circuit for inputting a high frequency electrical signal to the EA modulator. Therefore, the above-mentioned conventional art technology has a problem that its system configuration is complicated, and the cost of the apparatus is increased.

SUMMARY OF THE INVENTION

The present invention has been made in view of the above circumstances and provides an optical element integrated module.

According to an aspect of the invention, there is provided an optical element integrated module comprising: an optical element integrated module comprising: first through n-th (n being an integer equal to or more than two) optical circulators respectively comprising a first, second and third port, each of the optical circulators being arranged so as to output from the second port an optical signal input through the first port, to output from the third port an optical signal input through the second port and to output from the first port an optical signal input through the third port; an optical clock signal split section for generating first through n-th optical short pulse trains by splitting an optical short pulse train that is input externally; first through n-th optical/optical converters for outputting first through n-th modulated optical data signals by respectively modulating the first through n-th optical short pulse trains in accordance with respective first through n-th optical data signals; and an optical time division multiplexing section for generating optical time division multiplexed signals by time division multiplexing the first through n-th modulated optical data signals; wherein the first through n-th optical data signals are respectively externally input to the first port of the respective first through n-th optical circulators and input to the respective first through n-th optical/optical converters via the second port; and the first through n-th modulated optical data signals are respectively input to the second port of the respective first through n-th optical circulators and input to the optical time division multiplexing section via the third port.

BRIEF DESCRIPTION OF THE DRAWINGS

Preferred embodiments of the present invention will be described in detail based on the following figures, wherein.

DETAILED DESCRIPTION OF THE INVENTION

First Embodiment

Figure 1:
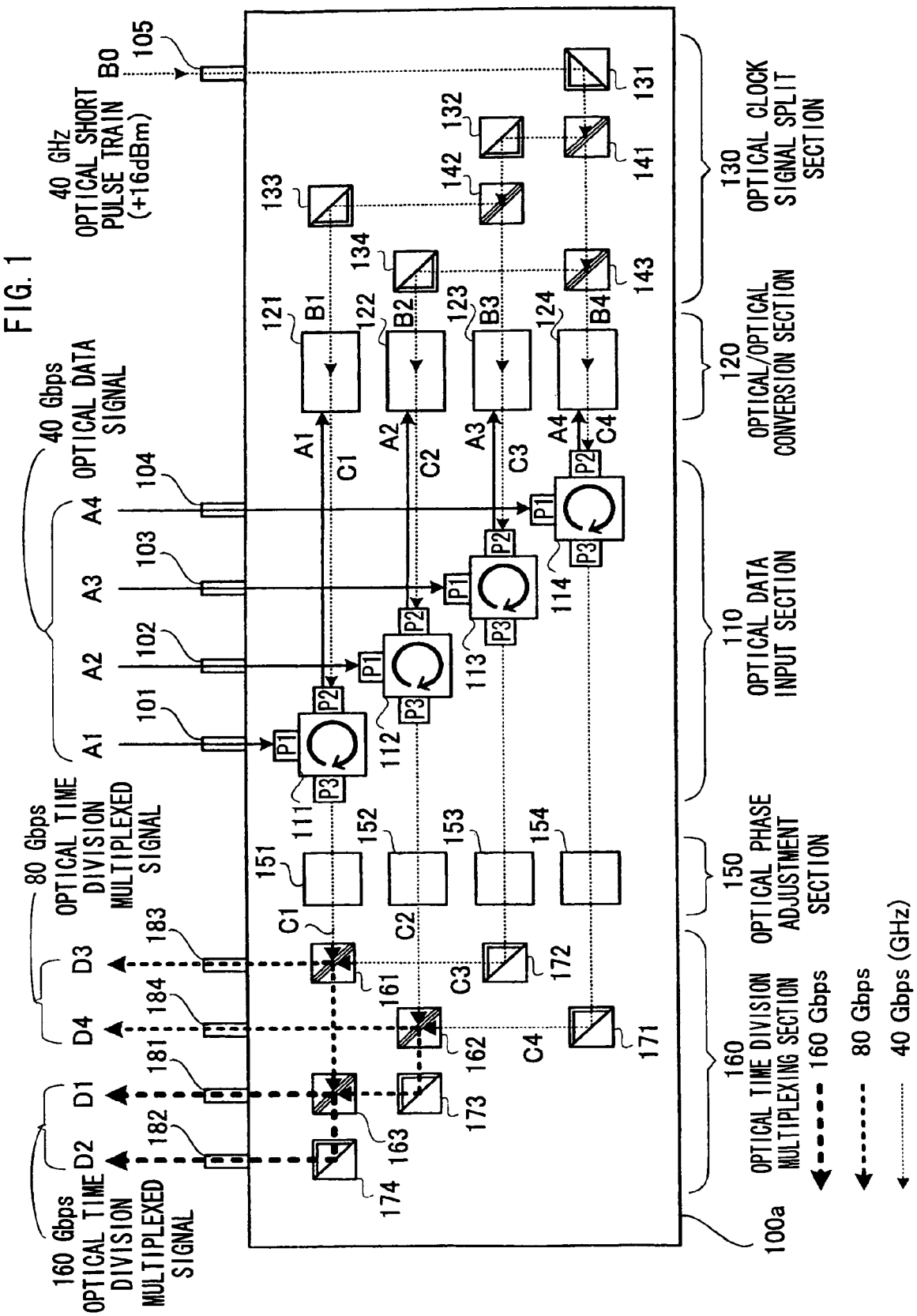
FIG. 1 is a diagram schematically showing a structure of an OMUX module as an optical element integrated module of a first embodiment of the invention.

FIG. 1 is a diagram schematically showing a structure of an optical multiplexer (OMUX) module 100 as an optical element integrated module of a first embodiment of the invention.

As shown in FIG. 1, the OMUX module 100 of the first embodiment has a casing 100a, and an optical data signal input section 110, an optical/optical conversion section 120, an optical clock signal split section 130, an optical phase adjustment section 150 and an optical time division multiplexing section 160 provided within the casing 100a. The OMUX module 100 of the first embodiment also includes, within the casing 100a, optical data signal input ports 101, 102, 103 and 104, an optical short pulse train (optical clock signal) input port 105, optical time division multiplexed signal output ports 181, 182, 183 and 184. As shown in FIG. 1, the optical data signal input section 110 is disposed between the optical/optical conversion section 120 and the optical time division multiplexing section 160 in the first embodiment. The optical phase adjustment section 150 is also disposed between the optical data signal input section 110 and the optical time division multiplexing section 160 in the first embodiment. Furthermore, the optical/optical conversion section 120 is disposed between the optical data signal input section 110 and the optical clock signal split section 130.

As shown in FIG. 1, the optical data signal input section 110 has first through fourth optical circulators 111, 112, 113 and 114. Each of the first through fourth optical circulators 111, 112, 113 and 114 has a first port P1, a second port P2 and a third port P3. Each of the first through fourth optical circulators 111, 112, 113 and 114 is arranged so as to output from the second port P2 an optical signal input through the first port P1, to output from the third port P3 an optical signal input through the second port P2 and to output from the first port P1 an optical signal input through the third port P3. As the first through fourth optical circulators 111, 112, 113 and 114, for example, two crystal polarizers facing to each other, a half-wavelength plate disposed between the crystal polarizers and a Faraday rotator (garnet film) may be used. A known optical circulator may be used for such optical circulators and is explained in "Illustrated Optical Device Dictionary" issued by Optronics Co., Ltd. on Jul. 10, 1996, Part I, Explanation of Words, p. 128 for example.

As shown in FIG. 1, the optical/optical conversion section 120 has first through fourth optical/optical modulators 121, 122, 123 and 124 utilizing cross absorption modulation. As a concrete example of the first through fourth optical/optical modulators 121, 122, 123 and 124, a mode of utilizing a cross absorption effect of an EA modulator is conceivable. A normal method of use of the EA modulator is to modulate an optical short pulse train by inputting a high frequency electrical signal. However, instead of using the high frequency electrical signal as a data input signal, optical data signals A1, A2, A3 and A4 are used as data input signals in the present invention. The cross absorption effect is an effect whereby a saturable absorber applied with a bias voltage becomes a light absorber while a first light input to a region to which the bias voltage is applied is weak, and the saturable absorber is unable to absorb other light and becomes a transparent body when the first light becomes strong. By utilizing this cross absorption effect, it is possible to transmit the optical short pulse trains B1, B2, B3 and B4 through the optical/optical modulators only while the optical data signals A1, A2, A3 and A4 are at a high level. It is noted that the cross absorption effect of the EA modulator is a known technology and is explained in the following document for example: Murai, Kagawa, Tsuji and Fujii, "80-Gb/s Error-Free Transmission Over 5600 km Using a Cross Absorption Modulation Based Optical 3R Regenerator", IEEE PHOTONICS TECHNOLOGY LETTERS, Vol. 17, No. 9, September 2005, pp. 1965-1967.

Further, other modulators such as a SOA (semiconductor optical amplifier) may be used for the optical/optical modulators 121, 122, 123 and 124.

As shown in FIG. 1, the optical clock signal split section 130 generates the first through fourth optical short pulse trains B1, B2, B3 and B4 by splitting an optical short pulse train (optical clock signal) B0 input from the external. The optical clock signal split section 130 has mirrors 131, 132, 133 and 134 and half mirrors 141, 142 and 143. The mirror 131 of the optical clock signal split section 130 reflects the optical short pulse train B0 at a right angle. The half mirror 141 splits the reflected optical short pulse train B0 into two directions intersecting at right angles. The half mirror 143 splits the optical short pulse train transmitted through the half mirror 141 into two directions intersecting at right angles. The mirror 132 reflects the optical short pulse train reflected by the half mirror 141 at a right angle. The half mirror 142 splits the optical short pulse train reflected by the mirror 132 into two directions intersecting at right angles. The mirror 133 reflects the optical short pulse train reflected by the half mirror 142 at a right angle. The mirror 134 reflects the optical short pulse train reflected by the half mirror 143 at a right angle. The optical short pulse train (optical clock signal) B0 input from the external is thus input to the first through fourth optical/optical modulators 121, 122, 123 and 124 of the optical/optical conversion section 120 as the first through fourth optical short pulse trains B1, B2, B3 and B4. It is noted that a frequency of the optical short pulse train B0 is 40 GHz and frequencies of the first through fourth optical short pulse trains B1, B2, B3 and B4 are also 40 GHz. However, the structure of the optical clock signal split section 130 is not limited to the structure shown in the figure.

As shown in FIG. 1, the optical phase adjustment section 150 has first through fourth optical phase modulators 151, 152, 153 and 154. The first through fourth optical phase modulators 151, 152, 153 and 154 are composed of liquid crystal parts for example. However, the structure of the optical phase adjustment section 150 is not limited to the structure shown in the figure. It is noted that the optical phase adjustment section 150 is an unnecessary part when phase adjustment of the modulated optical signal is not necessary.

As shown in FIG. 1, the optical time division multiplexing section 160 generates optical time division multiplexed signals D1, D2, D3 and D4 by time division multiplexing first through fourth modulated optical data signals C1, C2, C3 and C4. In the first embodiment, data rates of the first through fourth modulated optical data signals C1, C2, C3 and C4 are 40 Gbps, data rates of the optical time division multiplexed signals D1 and D2 are 160 Gbps and data rates of the optical time division multiplexed signals D3 and D4 are 80 Gbps. The optical time division multiplexing section 160 has half mirrors 161, 162 and 163 and mirrors 171, 172, 173 and 174. The mirror 171 reflects the fourth modulated optical data signal C4 at a right angle. The mirror 172 reflects the third modulated optical data signal C3 at a right angle. The half mirror 161 optically time division multiplexes and splits the first and third modulated optical data signals C1 and C3 into two directions intersecting at right angles. The half mirror 162 optically time division multiplexes and splits the second and fourth modulated optical data signals C2 and C4 into two directions intersecting at right angles. The mirror 173 reflects the modulated optical data signal output from the half mirror 162 at a right angle. The half mirror 163 time division multiplexes and splits the modulated optical data signal output from the half mirror 161 and the modulated optical data signal reflected by the mirror 173 into two directions intersecting at right angles. The mirror 174 reflects the modulated optical data signal output from the half mirror 163 at a right angle. However, the structure of the optical time division multiplexing section 160 is not limited to the structure shown in the figure.

Next, operations of the OMUX module 100 of the first embodiment will be explained. First through fourth optical data signals A1, A2, A3 and A4 are input respectively to first ports P1 of the first through fourth optical circulators 111, 112, 113 and 114 through optical data signal input ports 101, 102, 103 and 104 and are input respectively to the first through fourth optical/optical modulators 121, 122, 123 and 124 through second ports P2.

Meanwhile, the optical clock signal split section 130 splits the optical short pulse train B0 input through the input port 105 into the first through fourth optical short pulse trains B1, B2, B3 and B4 to input the first through fourth optical short pulse trains B1, B2, B3 and B4 respectively to the first through fourth optical/optical modulators 121, 122, 123 and 124. Utilizing the cross absorption effect, the optical/optical modulators 121, 122, 123 and 124 modulate the first through fourth optical short pulse trains B1, B2, B3 and B4 respectively in accordance with the input optical data signals A1, A2, A3 and A4 to output the first through fourth modulated optical data signals C1, C2, C3 and C4. In the first embodiment, the frequency of the optical short pulse train B0 is 40 GHz and the frequencies of the first through fourth optical short pulse trains B1, B2, B3 and B4 are 40 GHz. Further, data rates of the optical data signals A1, A2, A3 and A4 are 40 Gbps and data rates of the first through fourth modulated optical data signals C1, C2, C3 and C4 are 40 Gbps. Optical data signals output from end faces on the opposite sides (on the right end faces in FIG. 1) of the first through fourth optical/optical modulators 121, 122, 123 and 124 are all terminated at output ends. Specifically, while the optical data signals pass through the half mirrors, an optical data signal in which light is not condensed terminates by radiating and attenuating and an optical data signal that reaches the optical port is terminated by an optical isolator (not shown).

Each of the first through fourth modulated optical data signals C1, C2, C3 and C4 is input to each of the third ports P3 of each of the first through fourth optical circulators 111, 112, 113 and 114, and then it is input to the optical phase adjustment section 150 respectively via each of the third ports P3 and is input to the optical time division multiplexing section 160 after undergoing a phase adjustment.

The first through fourth modulated optical data signals C1, C2, C3 and C4 input to the optical time division multiplexing section 160 are optically time division multiplexed and are output from output ports 181 and 182 as the optical time division multiplexed signals D1 and D2 of 160 Gbps and are output from output ports 183 and 184 as the optical time division multiplexed signals D3 and D4 of 80 Gbps.

As described above, the OMUX module 100 of the first embodiment modulates the optical short pulse train in accordance with the optical data signal. Thereby, it becomes unnecessary to provide the electrical circuit for converting an optical data signal into a high frequency electrical signal or the electrical circuit for applying a high frequency electrical signal, thus enabling to realize the apparatus whose structure is simplified and whose cost is lowered.

Furthermore, according to the OMUX module 100 of the first embodiment, the first through fourth modulated optical data signals C1, C2, C3 and C4 are led to the optical time division multiplexing section 160 by using the first through fourth optical circulators 111, 112, 113 and 114. Therefore, it is possible to multiplex the signals without losing the power of the first through fourth modulated optical data signals C1, C2, C3 and C4, respectively, as compared to a mode of using half mirrors (a mode in which 3 dB (half of the power) is always lost) instead of the first through fourth optical circulators 111, 112, 113 and 114. Accordingly, it becomes possible to improve S/N of the output optical time division multiplexed signals.

It is noted that the case when the number of the input data signals is four and the number of the optical circulators, optical/optical modulators and optical phase adjusters are, respectively, four has been illustrated, however, the numbers of them may be any number as long as they are equal to two or more.

Further, the case when the input data signals are 40 Gbps and the optical time division multiplexed signals are 160 Gbps and 80 Gbps has been illustrated, however, another data rate may be also applicable.

Second Embodiment

Figure 2:
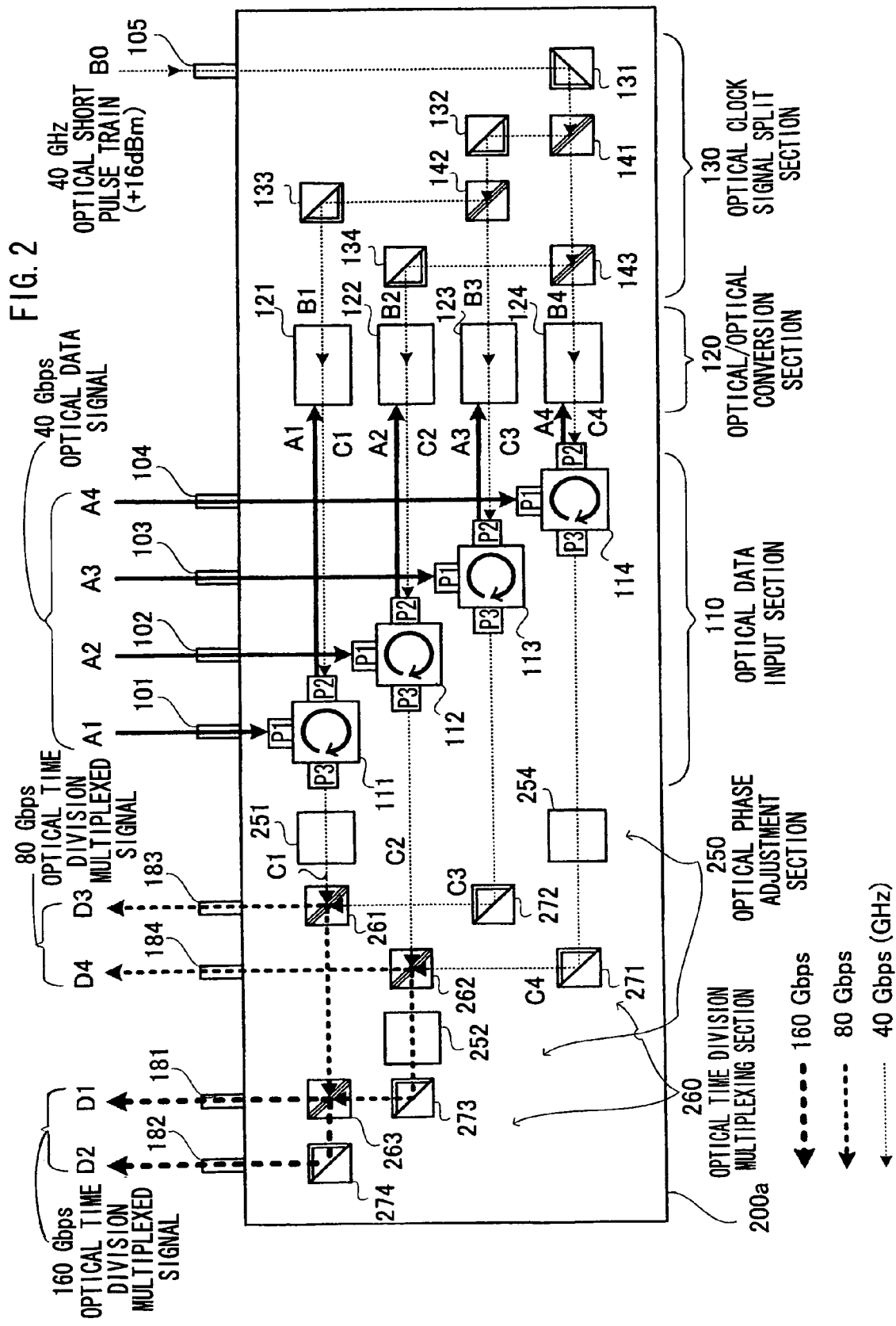
FIG. 2 is a diagram schematically showing a structure of an OMUX module as an optical element integrated module of a second embodiment of the invention.

FIG. 2 is a diagram schematically showing a structure of an optical multiplexer (OMUX) X module 200 as an optical element integrated module of a second embodiment of the invention. In FIG. 2, the same or corresponding components with the components shown in FIG. 1 are denoted by the same reference numerals and an explanation thereof will be omitted here.

As shown in FIG. 2, the OMUX module 200 of the second embodiment is different from the OMUX module 100 of the first embodiment in that structures of an optical phase adjustment section 250 and an optical time division multiplexing section 260 within a casing 200a are different.

In the first embodiment, the optical phase adjustment section 150 is disposed between the optical data signal input section 110 and the optical time division multiplexing section 160. Meanwhile, in the second embodiment, an optical phase adjustment section 250 has an optical phase adjustor 251 for adjusting a phase of the modulated optical data signal from the third port P3 of the optical circulator 111, an optical phase adjustor 254 for adjusting a phase of the modulated optical data signal from the third port P3 of the optical circulator 114 and an optical phase adjustor 252 for receiving an output from a half mirror 262 into which the modulated optical data signal from the third port P3 of the optical circulator 112 and the modulated optical data signal from the optical phase adjustor 254 are input.

Because an arrangement of carrying out the optical phase control in each path has been adopted in the first embodiment, it is necessary to control the two phase adjusters in the same time in the case when a multiplexed signal is further multiplexed. However, because the optical phase adjustor 252 is disposed on the downstream side of the half mirror 262, the phase control may be carried out just by controlling one control section for controlling the optical phase adjustor 252 in the second embodiment.

As described above, simplification of the optical phase adjustment section 250 and simplification of the phase adjustment control may be realized in addition to the effect of the first embodiment by the OMUX module 200 of the second embodiment.

It is noted that points of the second embodiment other than those described above are the same as the first embodiment.

Third Embodiment

Figure 3:
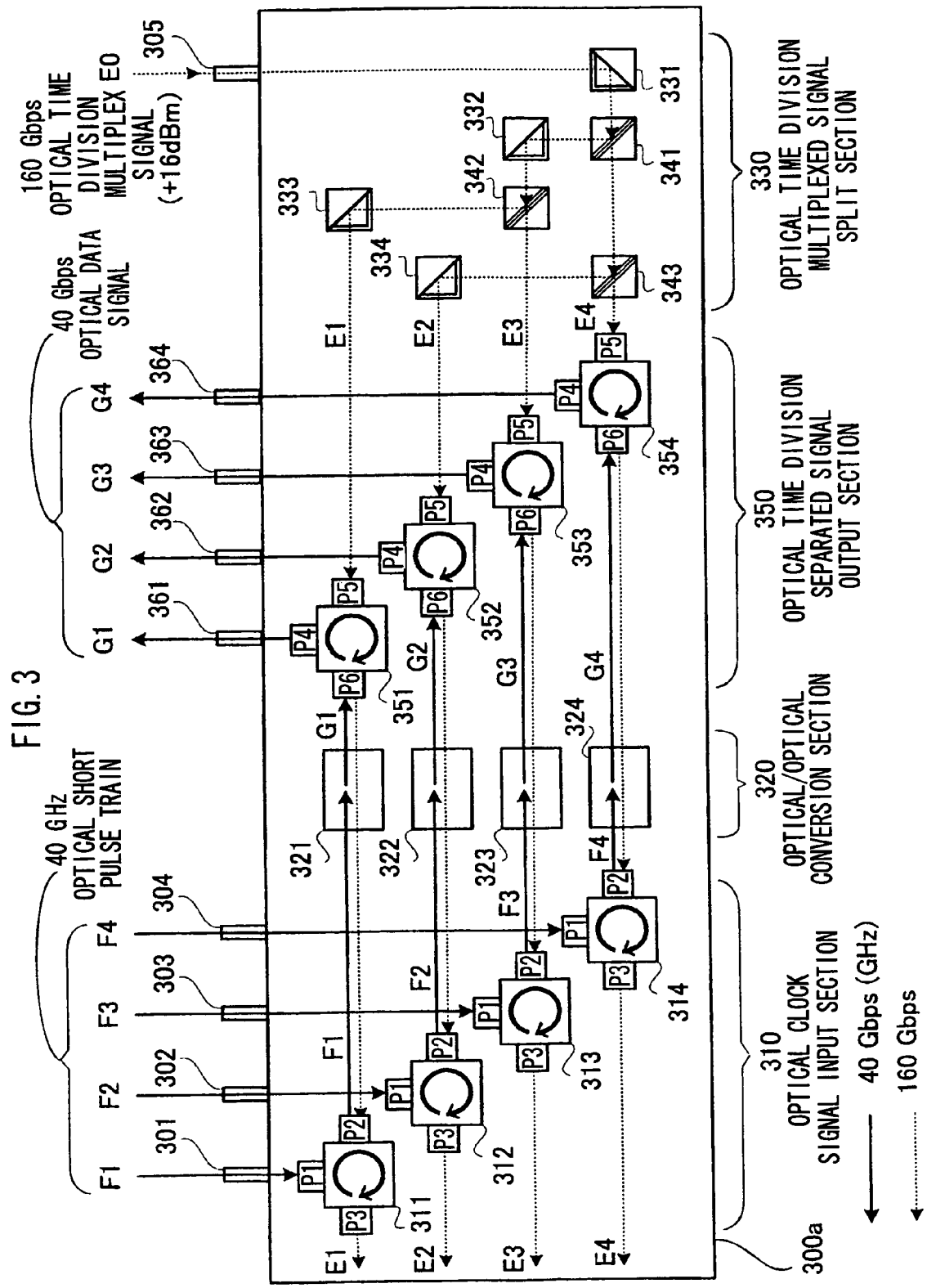
FIG. 3 is a diagram schematically showing a structure of an OMUX module as an optical element integrated module of a third embodiment of the invention.

FIG. 3 is a diagram schematically showing a structure of an optical multiplexer (ODeMUX) module 300 as an optical element integrated module of a third embodiment of the invention.

As shown in FIG. 3, the ODeMUX module 300 of the third embodiment has a casing 300a, and an optical clock signal input section 310, an optical/optical conversion section 320, an optical time division multiplexed signal split section 330 and an optical time division separated signal output section 350 provided within the casing 300a. The ODeMUX module 300 of the third embodiment also includes, within the casing 300a, optical short pulse train (optical clock signal) input ports 301, 302, 303 and 304, an optical time division multiplexed signal input port 305 and optical data signal output ports 361, 362, 363 and 364. As shown in FIG. 3, the optical/optical conversion section 320 is disposed between the optical clock signal input section 310 and the optical time division separated signal output section 350 and the optical time division separated signal output section 350 is also disposed between the optical/optical conversion section 320 and the optical time division multiplexed signal split section 330 in the third embodiment.

As shown in FIG. 3, the optical clock signal input section 310 has first through fourth input optical circulators 311, 312, 313 and 314. Each the first through fourth input optical circulators 311, 312, 313 and 314 has a first, second and third ports P1, P2 and P3. Each of the first through fourth input optical circulators 311, 312, 313 and 314 is arranged so as to output an optical signal input through the first port P1 from the second port P2, to output an optical signal input through the second port P2 from the third port P3 and to output an optical signal input through the third port P3 from the first port P1. The arrangement of the first through fourth input optical circulators 311, 312, 313 and 314 is the same as that of the optical circulators in the first embodiment.

As shown in FIG. 3, the optical/optical conversion section 320 has first through fourth optical/optical converters 321, 322, 323 and 324 utilizing a cross absorption modulation. The arrangement of the first through fourth optical/optical converters 321, 322, 323 and 324 is the same as that of the optical/optical converters of the first embodiment. Other modulators such as a SOA (semiconductor optical amplifier) may be used for the first through fourth optical/optical converters 321, 322, 323 and 324.

As shown in FIG. 3, the optical time division multiplexed signal split section 330 generates first through fourth optical time division multiplexed signals E1, E2, E3 and E4 (160 Gbps) by splitting an optical time division multiplexed signal E0 (160 Gbps, +16 dBm) input from the external. The optical time division multiplexed signal split section 330 has mirrors 331, 332, 333 and 334 and half mirrors 341, 342 and 343. The mirror 331 reflects the optical time division multiplexed signal E0 at a right angle. The half mirror 341 splits the reflected optical time division multiplexed signal E0 into two directions intersecting at right angles. The half mirror 343 splits the optical time division multiplexed signal transmitted through the half mirror 341 into two directions intersecting at right angles. The mirror 332 reflects the optical time division multiplexed signal reflected by the half mirror 341 at a right angle. The half mirror 342 splits the optical time division multiplexed signal reflected by the mirror 332 into two directions intersecting at right angles. The mirror 333 reflects the optical time division multiplexed signal reflected by the half mirror 342 at a right angle. The mirror 334 reflects the optical time division multiplexed signal reflected by the half mirror 343 at a right angle. However, the structure of the optical time division multiplexed signal split section 330 is not limited to the structure shown in the figure.

As shown in FIG. 3, the optical time division separated signal output section 350 has first through fourth output optical circulators 351, 352, 353 and 354. Each of the first through fourth output optical circulators 351, 352, 353 and 354 has a fourth port P4, a fifth port P5 and a sixth port P6. Each of the first through fourth output optical circulators 351, 352, 353 and 354 is arranged so as to output an optical signal input through the fourth port P4 from the fifth port P5, to output an optical signal input through the fifth port P5 from the sixth port P6 and to output an optical signal input through the sixth port P6 from the fourth port P4. The arrangement of the first through fourth output optical circulators 351, 352, 353 and 354 is the same as that of the optical circulators in the first embodiment. However, the structure of the optical time division separated signal output section 350 is not limited to the structure shown in the figure. For example, The output ports 361, 362, 363 and 364 may be provided on the lower side in FIG. 3 by reversing the first through fourth output optical circulators 351, 352, 353 and 354 upside down so that the light travels counterclockwise.

Next, operations of the ODeMUX module 300 of the third embodiment will be explained. Each of first through fourth optical short pulse trains (optical clock signals) F1, F2, F3 and F4 is input to each of the first ports P1 of each of the first through fourth input optical circulators 311, 312, 313 and 314 from the external via each of the input ports 301, 302, 303 and 304 and is input to each of the first through fourth optical/optical converters 321, 322, 323 and 324 via each of the second ports P2.

Meanwhile, the first through fourth optical time division multiplexed signals E1, E2, E3 and E4 which are generated from the optical time division multiplexed signal E0 input through the input port 305 of the optical time division multiplexed signal split section 330 are input respectively to the fifth ports P5 of the first through fourth output optical circulators 351, 352, 353 and 354 and are input respectively to the first through fourth optical/optical converters 321, 322, 323 and 324 via the sixth ports P6.

Each of the first through fourth optical/optical converters 321, 322, 323 and 324 outputs each of first through fourth modulated optical data signals G1, G2, G3 and G4 by modulating each of the first through fourth optical short pulse trains F1, F2, F3 and F4 in accordance with each of the first through fourth optical time division multiplexed signals E1, E2, E3 and E4.

Each of the first through fourth modulated optical data signals G1, G2, G3 and G4 output from each of the first through fourth optical/optical converters 321, 322, 323 and 324 is input to each of the sixth ports P6 of the first through fourth output optical circulators 351, 352, 353 and 354 and is output to the external via each of the fourth ports P4 through each of the output ports 361, 362, 363 and 364.

As described above, the ODeMUX module 300 of the third embodiment modulates the optical short pulse train in accordance with the optical data signal. Thereby, it becomes unnecessary to provide an electrical circuit for converting an optical data signal into a high frequency electrical signal or an electrical circuit for applying a high frequency electrical signal, thus enabling to realize an apparatus whose structure is simplified and whose cost is lowered.

Further, according to the ODeMUX module 300 of the third embodiment, the first through fourth optical short pulse trains F1, F2, F3 and F4 are led to the optical/optical conversion section 320 by using the first through fourth input optical circulators 311, 312, 313 and 314. Therefore, it is possible to multiplex the first through fourth optical short pulse trains F1, F2, F3 and F4 without loosing powers of the same as compared to a mode of using half mirrors (a mode of always loosing 3 dB (a half of power)) instead of the first through fourth optical circulators 311, 312, 313 and 314. Accordingly, it becomes possible to improve S/N of the output optical data signals 361, 362, 363 and 364.

It is noted that the case when the number of the input data signals is four and the number of the optical circulators and optical/optical modulators are, respectively, four has been illustrated, however, the number of them may be any number as long as it is equal to two or more.

Further, the case when the optical time division multiplexed signal E0 is 160 Gbps and the optical short pulse trains are 40 GHz has been illustrated, however, other frequency or data rate is also applicable.

While the embodiments of present invention have been described above, the invention is not limited to the embodiments as will be clear to those skilled in the art.

According to a first aspect of the invention, there is provided an optical element integrated module comprising: an optical element integrated module comprising: first through n-th (n being an integer equal to or more than two) optical circulators respectively comprising a first, second and third port, each of the optical circulators being arranged so as to output from the second port an optical signal input through the first port, to output from the third port an optical signal input through the second port and to output from the first port an optical signal input through the third port; an optical clock signal split section for generating first through n-th optical short pulse trains by splitting an optical short pulse train that is input externally; first through n-th optical/optical converters for outputting first through n-th modulated optical data signals by respectively modulating the first through n-th optical short pulse trains in accordance with respective first through n-th optical data signals; and an optical time division multiplexing section for generating optical time division multiplexed signals by time division multiplexing the first through n-th modulated optical data signals; wherein the first through n-th optical data signals are respectively externally input to the first port of the respective first through n-th optical circulators and input to the respective first through n-th optical/optical converters via the second port; and the first through n-th modulated optical data signals are respectively input to the second port of the respective first through n-th optical circulators and input to the optical time division multiplexing section via the third port.

According to a second aspect of the invention, there is provided an optical element integrated module comprising: an optical element integrated module comprising: first through n-th (n being an integer equal to or more than two) input optical circulators respectively comprising a first, second and third port, each of the optical circulators being arranged so as to output from the second port an optical signal input through the first port, to output from the third port an optical signal input through the second port and to output from the first port an optical signal input through the third port; first through n-th output optical circulators respectively comprising a fourth, fifth and sixth port and being arranged so as to output from the fifth port an optical signal input through the fourth port, to output from the sixth port an optical signal input through the fifth port and to output from the fourth port an optical signal input through the sixth port; first through n-th optical/optical converters; and an optical time division multiplexed signal split section for generating optical time division multiplexed signals by splitting an optical time division multiplexed signal that is input externally; wherein first through n-th optical short pulse trains are respectively externally input to the first port of the respective first through n-th input optical circulators and input to the respective first through n-th optical/optical converters via the second port; first through n-th optical time division multiplexed signals are respectively input to the fifth port of the respective first through n-th output optical circulators and input to the respective first through n-th optical/optical converters via the sixth port; the first through n-th optical/optical converters output respective first through n-th modulated optical data signals by modulating the respective first through n-th optical short pulse trains in accordance with the respective first through n-th optical time division multiplexed signals; and the first through n-th modulated optical data signals are respectively input to the sixth port of the respective first through n-th output optical circulators and is output externally via the fourth port.

According to the above aspects of the invention, the optical short pulse train is modulated in accordance with the optical data signal such that its structure can be simplified and its cost can be lowered.

Further, according to the above aspects, the modulated optical data signals output from the optical/optical converters are led to the optical time division multiplexing section or to the optical time division separated signal output section via the optical circulators, so that it is possible to suppress a loss of power of the output optical signals.

What is claimed is:

1. An optical element integrated module comprising:
   first through n-th (n being an integer equal to or more than two) optical circulators respectively comprising a first, second and third port, each of the optical circulators being arranged so as to output from the second port an optical signal input through the first port, to output from the third port an optical signal input through the second port and to output from the first port an optical signal input through the third port;
   an optical clock signal split section for generating first through n-th optical short pulse trains by splitting an optical short pulse train that is input externally;
   first through n-th optical/optical converters for outputting first through n-th modulated optical data signals by respectively modulating the first through n-th optical short pulse trains in accordance with respective first through n-th optical data signals; and
   an optical time division multiplexing section for generating optical time division multiplexed signals by time division multiplexing the first through n-th modulated optical data signals; wherein
   the first through n-th optical data signals are respectively externally input to the first port of the respective first through n-th optical circulators and input to the respective first through n-th optical/optical converters via the second port; and
   the first through n-th modulated optical data signals are respectively input to the second port of the respective first through n-th optical circulators and input to the optical time division multiplexing section via the third port.

2. The optical element integrated module according to claim 1, wherein each of the first through n-th optical/optical converters is a modulator utilizing cross absorption modulation.

3. The optical element integrated module according to claim 1, wherein the first through n-th optical circulators are disposed between the first through n-th optical/optical converters and the optical time division multiplexing section.

4. The optical element integrated module according to claim 1, further comprising an optical phase adjustment section for modulating the phase of each or several of the first through n-th modulated optical data signals.

5. The optical element integrated module according to claim 1, wherein
   n is 4;
   the frequency of the optical short pulse train is 40 GHz;
   the frequency of the first through n-th optical short pulse trains is 40 GHz;
   the data rate of the first through n-th optical data signals is 40 Gbps; and
   each of the optical time division multiplexed signals contains an optical signal having a data rate of 160 Gbps.

6. An optical element integrated module comprising:
   first through n-th (n being an integer equal to or more than two) input optical circulators respectively comprising a first, second and third port, each of the optical circulators being arranged so as to output from the second port an optical signal input through the first port, to output from the third port an optical signal input through the second port and to output from the first port an optical signal input through the third port;
   first through n-th output optical circulators respectively comprising a fourth, fifth and sixth port and being arranged so as to output from the fifth port an optical signal input through the fourth port, to output from the sixth port an optical signal input through the fifth port and to output from the fourth port an optical signal input through the sixth port;
   first through n-th optical/optical converters; and
   an optical time division multiplexed signal split section for generating optical time division multiplexed signals by splitting an optical time division multiplexed signal that is input externally; wherein
   first through n-th optical short pulse trains are respectively externally input to the first port of the respective first through n-th input optical circulators and input to the respective first through n-th optical/optical converters via the second port;
   first through n-th optical time division multiplexed signals are respectively input to the fifth port of the respective first through n-th output optical circulators and input to the respective first through n-th optical/optical converters via the sixth port;

the first through n-th optical/optical converters output respective first through n-th modulated optical data signals by modulating the respective first through n-th optical short pulse trains in accordance with the respective first through n-th optical time division multiplexed signals; and the first through n-th modulated optical data signals are respectively input to the sixth port of the respective first through n-th output optical circulators and is output externally via the fourth port.

7. The optical element integrated module according to claim 6, wherein each of the first through n-th optical/optical converters is a modulator utilizing cross absorption modulation.

8. The optical element integrated module according to claim 6, wherein the first through n-th optical/optical converters are disposed between the first through n-th input optical circulators and the first through n-th output optical circulators; and the first through n-th output optical circulators are disposed between the first through n-th optical/optical converters and the optical time division multiplexed signal split section.

9. The optical element integrated module according to claim 6, wherein n is 4;

the frequency of the first through n-th optical short pulse trains is 40 GHz;

the data rate of the optical time division multiplexed signal is 160 Gbps;

the data rate of the first through n-th optical time division multiplexed signals is 160 Gbps; and the data rate of the first through n-th modulated optical data signals is 40 Gbps.

\* \* \* \* \*